United States Patent
Haraguchi et al.

(10) Patent No.: US 7,395,148 B2
(45) Date of Patent: Jul. 1, 2008

(54) FUEL INJECTION CONTROLLER FOR INTERNAL COMBUSTION ENGINE

(75) Inventors: Hiroshi Haraguchi, Kariya (JP); Youhei Morimoto, Kariya (JP); Shinya Hoshi, Kariya (JP)

(73) Assignee: Denso Corporation, Kariya, Aichi-pref. (JP)

( * ) Notice: Subject to any disclaimer, the term of this patent is extended or adjusted under 35 U.S.C. 154(b) by 0 days.

(21) Appl. No.: 11/878,531

(22) Filed: Jul. 25, 2007

(65) Prior Publication Data
US 2008/0053400 A1 Mar. 6, 2008

(30) Foreign Application Priority Data
Aug. 29, 2006 (JP) ............................. 2006-232654

(51) Int. Cl.
*G06F 19/00* (2006.01)

(52) U.S. Cl. ....................................... 701/104
(58) Field of Classification Search ................. 701/104, 701/105, 109; 123/435, 478, 480, 674, 698
See application file for complete search history.

(56) References Cited

U.S. PATENT DOCUMENTS

| | | | | |
|---|---|---|---|---|
| 4,962,739 A | * | 10/1990 | Wataya | 123/435 |
| 5,934,249 A | * | 8/1999 | Nanba et al. | 701/108 |
| 5,988,138 A | * | 11/1999 | Kadota | 123/305 |
| 6,209,515 B1 | * | 4/2001 | Gotoh et al. | |
| 2006/0293828 A1 | * | 12/2006 | Ishizuka et al. | |

FOREIGN PATENT DOCUMENTS

| | | | |
|---|---|---|---|
| JP | 3331987 | * | 12/1991 |
| JP | 3331991 | * | 12/1991 |
| JP | 2007-032540 | * | 2/2007 |

\* cited by examiner

*Primary Examiner*—Hieu T Vo
(74) *Attorney, Agent, or Firm*—Nixon & Vanderhye P.C.

(57) ABSTRACT

A fourth cylinder is mounted with a cylinder pressure sensor. The injection timing of the fourth cylinder is operated so as to feedback control the ignition timing of the fourth cylinder, which is detected by the cylinder pressure sensor, to a target ignition timing. The ignition timings of the first cylinder to the third cylinder are indirectly controlled by operating the injection timings so as to make output torques produced by combustion in the first cylinder to the third cylinder correspond to an output torque produced by combustion in the fourth cylinder.

13 Claims, 13 Drawing Sheets

FUEL INJECTION CONTROLLER FOR INTERNAL COMBUSTION ENGINE

CROSS REFERENCE TO RELATED APPLICATION

This application is based on Japanese Patent Application No. 2006-232654 filed on Aug. 29, 2006, the disclosure of which is incorporated herein by reference.

FIELD OF THE INVENTION

The present invention relates to a fuel injection controller for a multi-cylinder internal combustion engine of a compression ignition type. The controller drives a fuel injection valve on the basis of pressure in the combustion chamber of a part of cylinders in order to control an ignition timing of each cylinder to a target ignition timing.

BACKGROUND OF THE INVENTION

As is disclosed in Japanese Patent No. 3331987 (U.S. Pat. No. 6,209,515B1), there has been well known a control apparatus that has a cylinder pressure sensor for detecting pressure in a combustion chamber mounted on only a cylinder, in which the quantity of exhaust gas recirculated (EGR) into an intake passage from an exhaust passage is the largest, and controls injection start timings of all cylinders on the basis of the pressure detected by the cylinder pressure sensor. Here, in view of the fact that combustion tends to easily become unstable in a cylinder having the largest quantity of EGR, the cylinder pressure sensor is mounted only on the cylinder having the largest quantity of EGR. With this, an ignition timing of a cylinder in which combustion tends to become most unstable can be directly found on the basis of the detection result of the cylinder pressure sensor, which in turn makes it possible to avoid mounting all cylinders with cylinder pressure sensors and to control the injection timings of all cylinders so as not to cause a misfire.

However, in the foregoing control apparatus, when the state of inflow of the quantity of EGR of each cylinder is changed by the secular change or the like of the internal combustion engine, if the ignition timings of all cylinders are controlled in the manner described above, depending on a cylinder, there can be developed an event in which the ignition timing of the cylinder is not suitable. When an internal combustion engine has a cylinder of which ignition timing is not suitable, the exhaust characteristics of the internal combustion engine is impaired or the drivability of a vehicle mounted with the internal combustion engine is reduced.

SUMMARY OF THE INVENTION

The present invention has been made to solve the foregoing problems. An object of the present invention is to provide a fuel injection controller for a multi-cylinder internal combustion engine of a compression ignition type that can suitably control the injection timings of all cylinders on the basis of pressure in the combustion chamber of a part of cylinders.

According to the present invention, a fuel injection controller includes a part-of-cylinders ignition timing control means that operates an injection timing of the part of the cylinders on the basis of the detection result by the detection means in the part of the cylinders to feedback control an ignition timing computed on the basis of the detection result to the target ignition timing. The controller further includes an other-cylinders control means that operates injection timings of other cylinders in such a way as to make torques produced by combustion in the other cylinders correspond to a torque produced by combustion in the part of the cylinders at a time of the feedback control performed by the part-of-cylinders ignition timing control means, thereby controlling ignition timings of the other cylinders in such a way as to correspond to the ignition timing of the part of the cylinders.

In the foregoing construction, the ignition timing of the part of the cylinders can be computed by the detection result of the detection means. For this reason, this computed ignition timing can be feedback controlled to the target ignition timing. In contrast to this, the ignition timings of the other cylinders cannot be directly found. However, when an actual ignition timing can be controlled to the target ignition timing in the part of the cylinders whereas actual ignition timings are separate from the target ignition timing in the other cylinders, deviations occur between the torque produced by combustion in the part of the cylinders and the torques produced by combustion in the other cylinders. In the above construction, in view of this problem, the injection timings of the other cylinders are operated at the time of the control by the part-of-cylinders control means in such a way as to make the torques produced by combustion in the other cylinders correspond to the torque produced by combustion in the part of the cylinders. With this, when these torques correspond to each other, it can be thought that the ignition timings of the other cylinders correspond to the target ignition timing. Thus, in the above construction, the injection timings of all cylinders of the internal combustion engine can be suitably controlled on the basis of the detected pressure in the combustion chamber of the part of the cylinders of the engine.

DETAILED DESCRIPTION OF THE PREFERRED EMBODIMENTS

First Embodiment

Hereinafter, a first embodiment in which a fuel injection controller for an internal combustion engine according to the present invention is applied to a fuel injection controller mounted in a diesel engine will be described with reference to the drawings.

Figure 1:
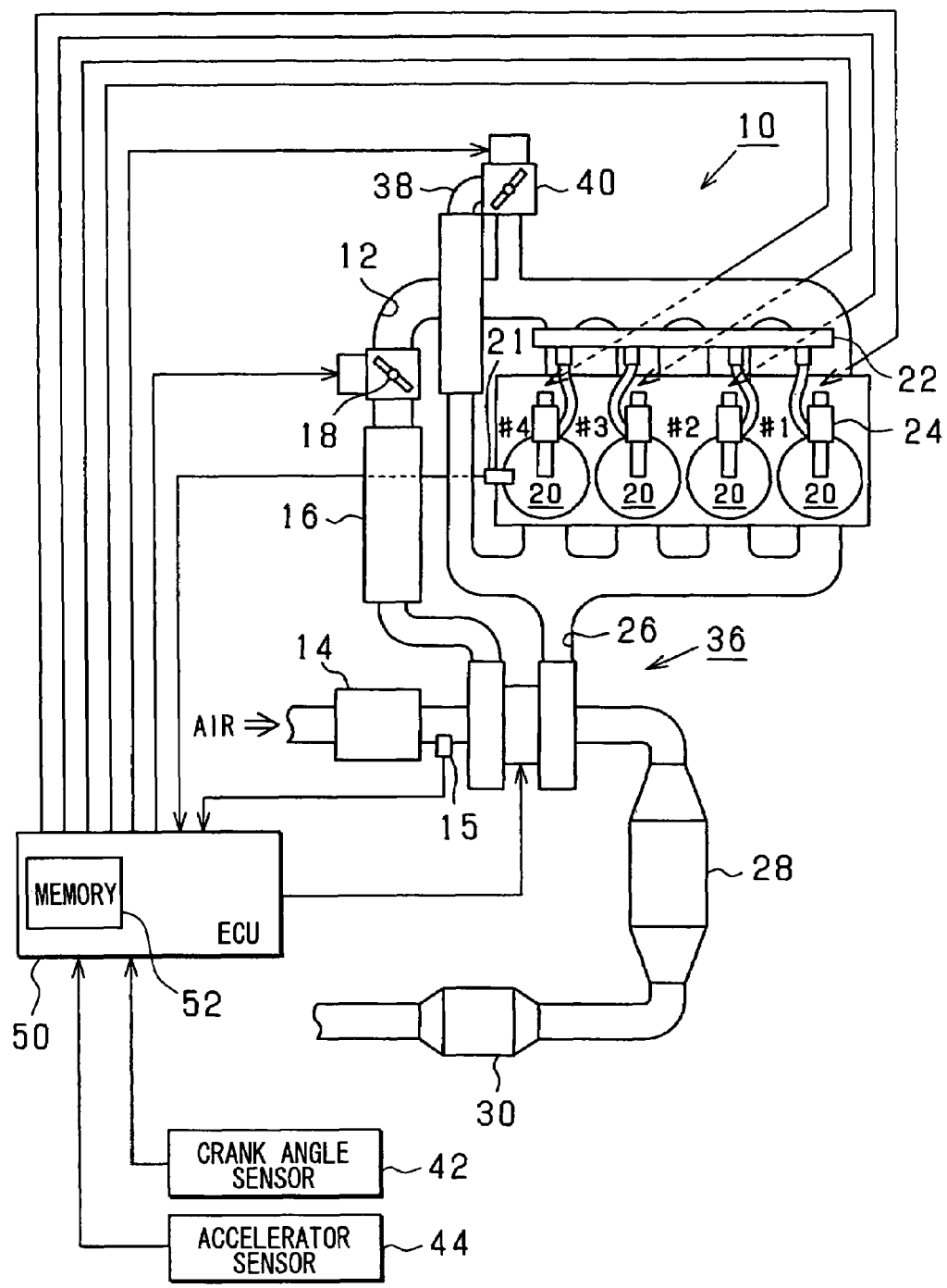
FIG. 1 is a diagram to show the entire construction of an engine system according to a first embodiment.

In FIG. 1 is shown the entire construction of an engine system according to this embodiment.

As shown in the drawing, an air cleaner 14, an air flow meter 15, a cooler 16, a throttle valve 18 are disposed upstream of an intake passage 12 of a diesel engine 10. The intake passage 12 is made to communicate with the combustion chambers 20 of respective cylinders (here, four cylinders of a first cylinder #1 to a fourth cylinder #4 are shown by way of example). High pressure fuel accumulated in a common rail 22 is injected into these combustion chambers 20 via fuel injection valves 24. With this, an air-fuel mixture of fuel and air in the combustion chamber 20 is supplied to combustion to produce the rotational force of the diesel engine 10. Here, the combustion chamber 20 of the fourth cylinder #4 is provided with a cylinder pressure sensor 21 for detecting pressure in the combustion chamber 20.

On the other hand, the exhaust gas is exhausted into an exhaust passage 26. The exhaust passage 26 is provided with an oxidation catalyst 28 and a NOx adsorbing reduction catalyst 30 for adsorbing and reducing nitrogen oxides (NOx).

The intake passage 12 and the exhaust passage 26 are provided with a variable nozzle type turbocharger 36. Moreover, the intake passage 12 and the exhaust passage 26 are provided with an exhaust gas recirculation passage (EGR passage) 38 capable of making these passages 12, 26 communicate with each other and the passage area between the intake passage 12 and the EGR passage 38 can be regulated by an EGR valve 40.

The engine system described above is provided with various kinds of sensors for detecting the operating state of the diesel engine 10 such as a crank angle sensor 42 for detecting the rotational angle of the crankshaft of the diesel engine 10. Further, the engine system is provided with various kinds of sensors for detecting a request made by a user such an accelerator sensor 44 for detecting the operation quantity of an accelerator pedal.

An electronic control unit (ECU) 50 is constructed of a central processing unit, a continuous storage holding memory 52, and the like. Here, the continuous storage holding memory 52 is a storage device for holding data irrespective of the state of a power supply switch such as a backup RAM in which the state of power supply is continuously held irrespective of the state of an ignition switch (power supply switch of the ECU 50) and a nonvolatile memory that holds data continuously irrespective of the presence or absence of the power supply The ECU 50 operates various kinds of actuators such as the fuel injection valve 24 on the basis of the detection values of the various kinds of sensors for detecting the operating state of the diesel engine 10 and the request made by the user to control the output characteristics (output torque, exhaust characteristics) of the diesel engine 10. In particular, the ECU 50 performs the fuel injection control of operating a fuel injection quantity and a fuel injection timing so as to control the output characteristics. For example, the ECU 50 computes a required quantity of injection of the diesel engine 10 on the basis of the revolution speed, which is based on the detection value of the crank angle sensor 42, and the operation quantity of the accelerator pedal, which is detected by the accelerator sensor 44. Then, the ECU 50 operates the fuel injection valve 24 on the basis of the required quantity of injection to control an output torque to a required torque responsive to the operation quantity of the accelerator pedal. However, at this time, because variations in injection characteristics are caused by the individual difference and the secular change of the fuel injection valve 24, even when the command value of an injection quantity (command injection quantity) to the fuel injection valve 24 is the same, an actual injection quantity might be not the same. Thus, the ECU 50 learns a deviation in the injection characteristics to compensate the deviation, that is, performs the so-called learning control.

Figure 2:
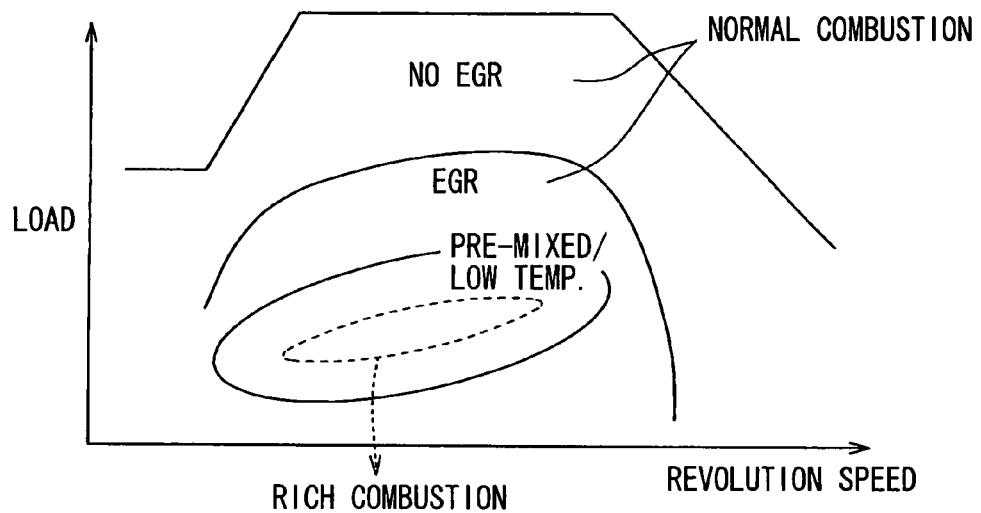
FIG. 2 is a diagram to show the relationship between the operating range and the combustion state of a diesel engine according to the first embodiment.

When the fuel injection control is performed, the exhaust characteristics of the diesel engine 10 also need to be controlled. The control of the exhaust characteristics can be performed by controlling an ignition timing. Here, the ignition timing can be controlled by operating the injection timing, but a change in the ignition timing relative to a change in the injection timing is greatly different depending on a combustion control mode. FIG. 2 shows the combustion control mode in this embodiment. In this embodiment, the combustion control mode is switched according to the revolution speed and the load (torque, injection quantity, and the like). Here, in a normal combustion range, fresh air is excessive to fuel. Here, a proportion of the quantity of EGR (hereinafter referred to as "EGR rate") in the gas charged into the combustion chamber 20 is a specified rate (for example, "30%") or less. Moreover, in a pre-mixed/low-temperature combustion range, the quantity of EGR is excessive. Here, the EGR rate is a specified rate larger than in the normal combustion rage (for example, "40 to 50%"). Moreover, in a rich combustion range, an air-fuel ratio is a specified value (for example, "14.5") or less.

The rich combustion is carried out occasionally only for several seconds to several tens of seconds, for example, at the time of rich purge of the NOx adsorbent reduction catalyst 30 (the rich purge means that the ambient atmosphere of the NOx adsorbent reduction catalyst 30 is brought to a rich atmosphere to reduce the adsorbed NOx). This rich combustion is carried out usually in the range in which the pre-mixed/low-temperature combustion is carried out.

In the foregoing normal combustion range, combustion is stable and the ignition timing is not so changed by a small change in the injection timing. For this reason, a very high degree of accuracy is not required in the operation of the ignition timing. On the other hand, in the pre-mixed/low-temperature combustion range and in the rich combustion range, combustion easily tends to be unstable and the ignition timing is greatly changed by a small change in the injection timing. For this reason, to control the exhaust characteristics well, it is preferable to detect the ignition timing and to operate the injection timing with a high degree of accuracy. Here, in view of the fact that pressure in the combustion chamber 20 is increased by the ignition of the fuel, the ignition timing can be detected by the cylinder pressure sensor 21. However, when all cylinders are provided with the cylinder pressure sensors, the number of components is increased. Then, in this embodiment, one cylinder (fourth cylinder #4) is provided with the cylinder pressure sensor 21 and the other cylinders (first cylinder #1 to third cylinder #3) are made to correspond to the torque produced by the combustion in the fourth cylinder #4 to control their ignition timings indirectly.

Figure 3A:
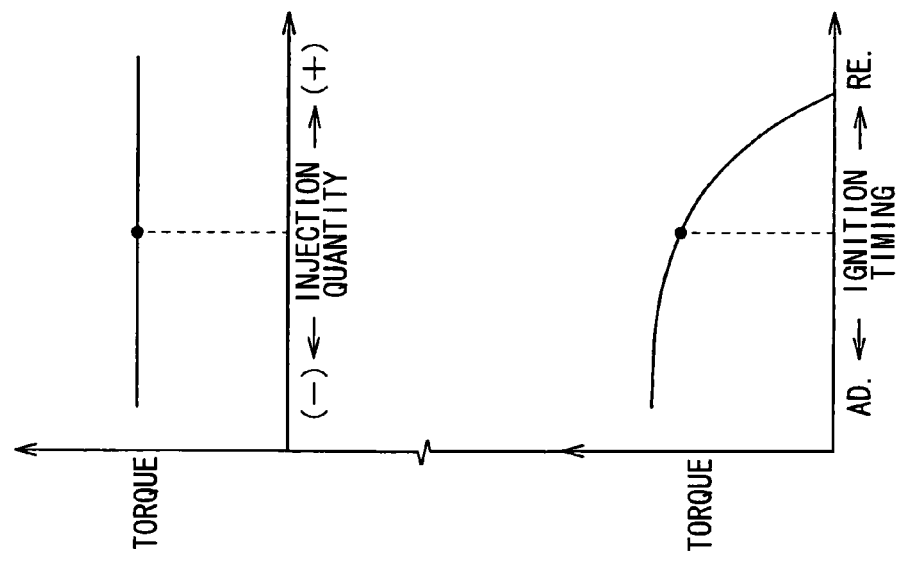
FIGS. 3A, 3B, and 3C are diagrams to show the relationship between an injection quantity and an output torque and the relationship between an injection timing and an output torque in respective combustion states.
Figure 3B:
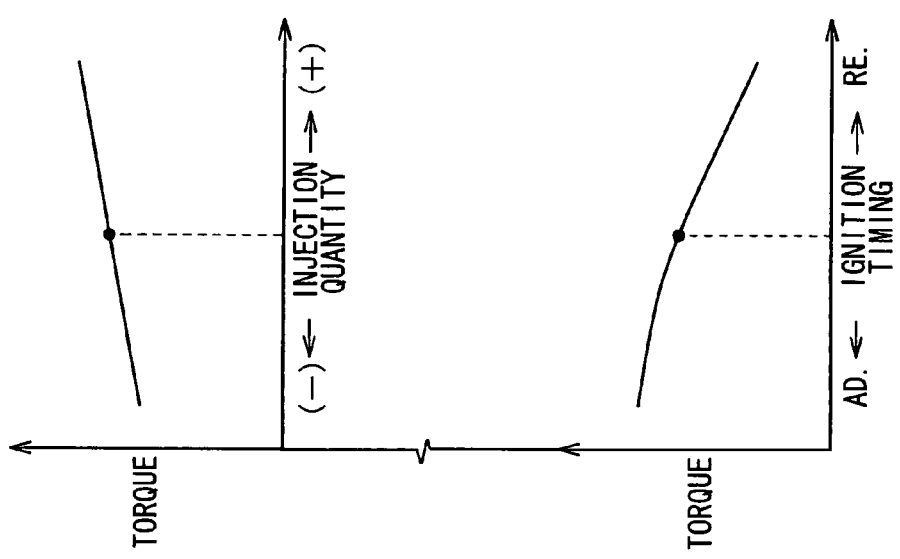
Figure 3C:
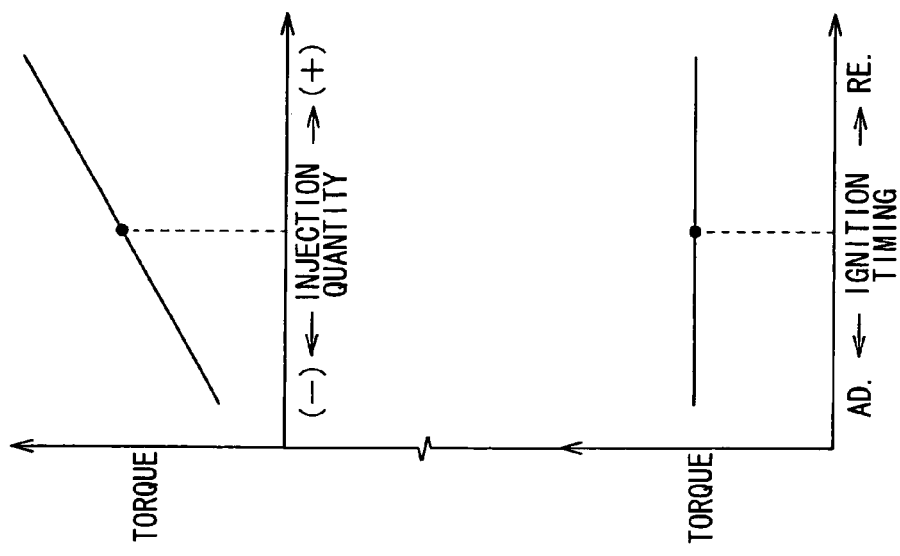

This control is control based on the characteristics shown in FIGS. 3A to 3C. As shown in FIG. 3A, in the normal combustion range, an output torque is changed in response to a small change in the injection quantity whereas the output torque is hardly changed in response to a small change in the ignition timing. In contrast to this, as shown in FIG. 3B, in the pre-mixed/low-temperature combustion range, a change in the output torque to a small change in the injection quantity becomes duller than in the normal combustion range. Further, at this time, the output torque is changed by a small change in the ignition timing. Further, as shown in FIG. 3C, in the rich combustion range and in an extremely large EGR combustion range in which the EGR rate is further increased than in the low-temperature combustion, the output torque is hardly changed by a change in the injection quantity. Further, at this time, the degree of change in the output torque to a change in the ignition timing is further increased than in the low-temperature combustion.

Figure 4:
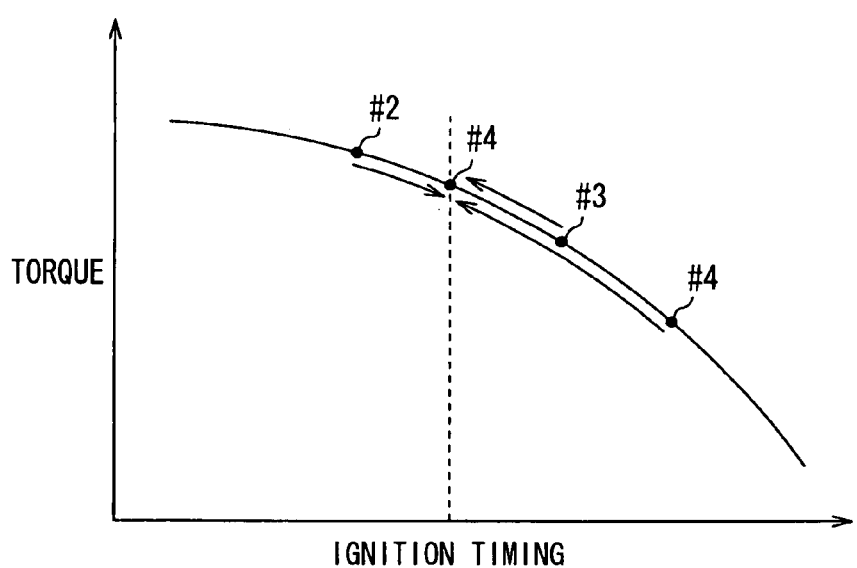
FIG. 4 is a diagram to show a method for controlling an ignition timing according to the first embodiment.

In view of the characteristics described above, it can be thought that when the torques produced by the combustion in the first cylinder #1 to the third cylinder #3 are made to correspond to the torque produced by the combustion in the fourth cylinder #4 in the pre-mixed/low-temperature combustion range and in the rich combustion range, as shown in FIG. 4, the ignition timings of the first cylinder #1 to the third cylinder #3 also can be controlled to desired ignition timings.

Here, it is because the EGR gas most easily flows into the combustion chamber 20 of the fourth cylinder #4 that the fourth cylinder #4 is provided with cylinder pressure sensor 21. When the quantity of the EGR gas is large, combustion easily becomes unstable and hence the fourth cylinder #4 becomes a cylinder in which combustion most easily becomes unstable. Hence, by providing this cylinder with the cylinder pressure sensor 21, the ignition timing is directly found.

Figure 5:
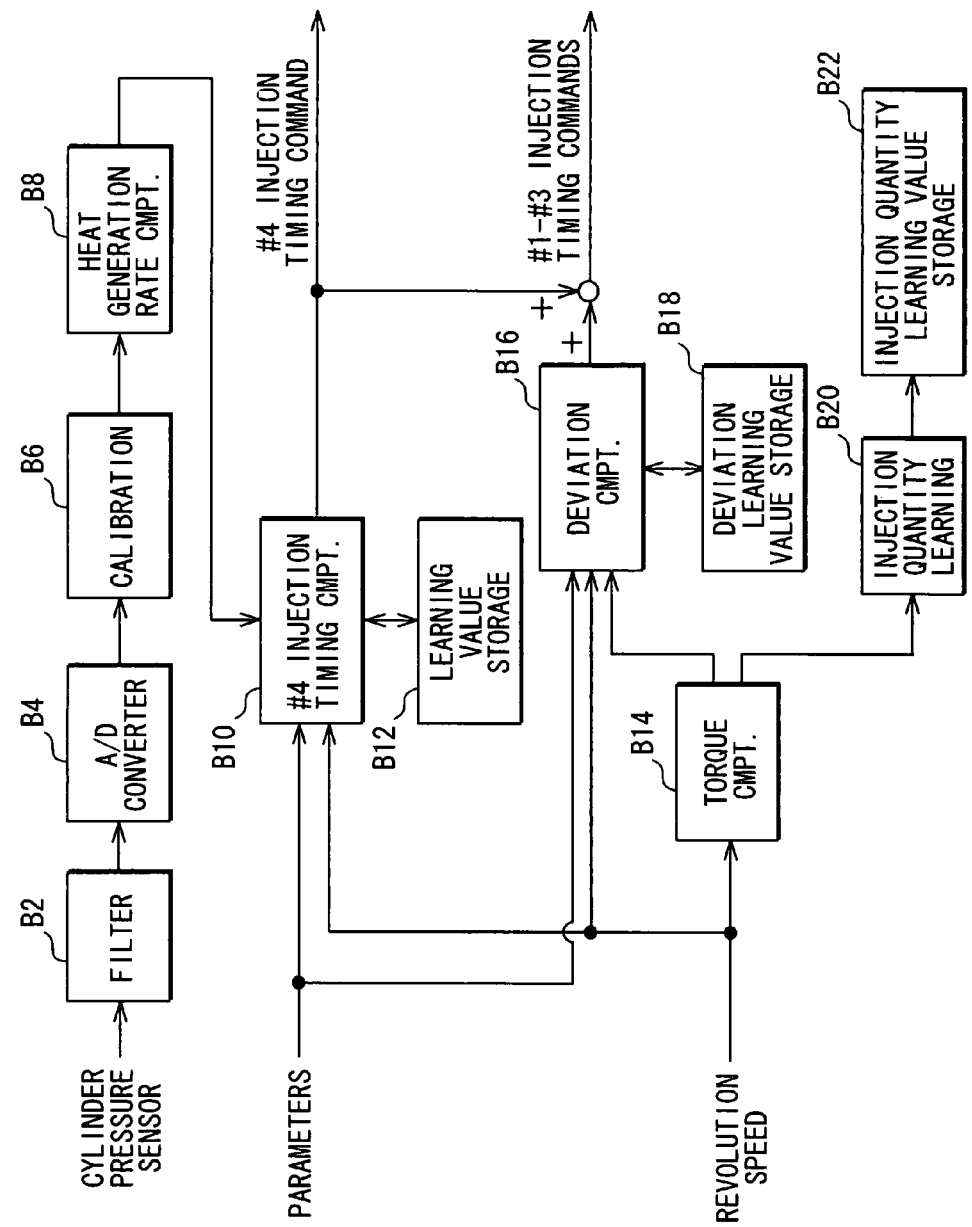
FIG. 5 is a diagram to show processing relating to fuel injection control according to the embodiment.

A processing related to fuel injection control of processing performed by the ECU 50 is shown in FIG. 5.

A filter B2 is a part for performing filtering processing so as to remove noises and the like from the output of the cylinder pressure sensor 21. An A/D conversion section B4 is a section for converting the analog data of the output of the filter 2 to digital data. A sensor output calibration section B6 calibrates the output of the A/D conversion section B4 to perform the processing of compensating the individual difference of the cylinder pressure sensor 21. A heat generation rate computation section B8 computes a heat generation rate as time-series data on the basis of the pressure in the combustion chamber 20 detected by the cylinder pressure sensor 21.

A fourth-cylinder injection timing computation section B10 is a section for feedback controlling the injection timing of the fourth cylinder to a target injection timing on the basis of a parameter showing the various operating states such as revolution speed and the heat generation rate. On the other hand, a fourth-cylinder injection timing learning value storage section B12 stores the learning value of the suitable timing as the injection timing of the fourth cylinder #4. When the foregoing feedback control of the ignition timing of the fourth cylinder #4 is performed, the feed-forward control of the ignition timing is performed for each operating state in combination, so a feedback correction quantity is learned as a learning value. Here, the fourth-cylinder injection timing computation section B10 is constructed of the continuous storage holding memory 52.

A torque computation section B14 is a section for computing various kinds of physical quantities quantifying output torque on the basis of the revolution speed of the diesel engine 10. An injection timing deviation computation section B16 is a section for computing a deviation of the injection timing of each of the first to third cylinders #1 to #3 from the injection timing of the fourth cylinder #4 on the basis of the output of the torque computation section B14. The deviation is required to bring the torque produced by the combustion in each of the first to third cylinders #1 to #3 in agreement with the torque produced by the combustion of the fourth cylinder #4. The sum of the deviation computed in this manner and the injection timing in the fourth cylinder #4 becomes a command value of the injection timing of each of the first to third cylinders #1 to #3. A deviation learning value storage section B18 stores the learning value of a suitable value as the deviation of each of the first to third cylinders #1 to #3. In this embodiment, when the control of the ignition timing based on the foregoing deviation of the injection timing is performed, the feed-forward control of the deviation is performed in combination for each operating mode, so a feedback correction quantity is learned as a learning value. Here, the deviation learning value storage section B18 is constructed of the continuous storage holding memory 52.

An injection quantity learning section B20 learns the learning value of an injection quantity for compensating variations between the cylinders in the torque produced by the combustion of the fuel in the combustion chamber 20 on the basis of the output of the torque computation section B14. An injection quantity learning value storage section B22 stores the learning values of the injection quantities of the respective cylinders. Here, the injection quantity learning value storage section B22 is constructed of the continuous storage holding memory 52.

Hereinafter, processing relating to the learning of the injection quantity and processing relating to the ignition timing control will be described in this order.

<Injection Quantity Learning Processing>

Figure 6A:
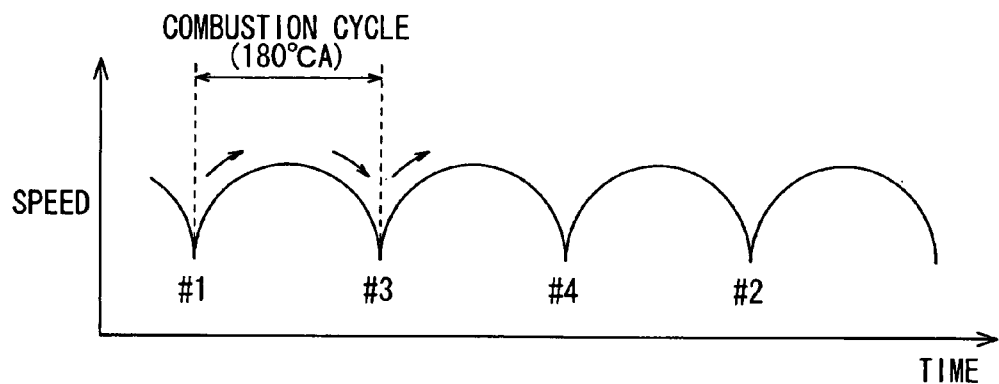
FIGS. 6A and 6B are time charts to show the progress of revolution speed in respective cylinders.

The revolution speed of the crankshaft is controlled to a desired revolution speed by the fuel injection control. When the revolution speed is analyzed at small time intervals, an increasing revolution speed and a decreasing revolution speed are repeated in synchronization with each stroke in a combustion cycle. That is, as shown in FIG. 6A, the sequence of combustion of the cylinders is the first cylinder (#1)→the third cylinder (#3)→the fourth cylinder (#4)→the second cylinder (#2), and the fuel is injected and supplied to combustion at intervals of 180° CA. At this time, when the progress of the revolution speed of each cylinder is viewed in terms of the combustion period of each cylinder (period of 180° CA), a rotational force is applied to the crankshaft by the combustion to increase the revolution speed and then the revolution speed is decreased by the load applied to the crankshaft and the like. In this case, it is thought that the work volume of each cylinder can be estimated according to the behavior of the revolution speed.

Figure 6B:
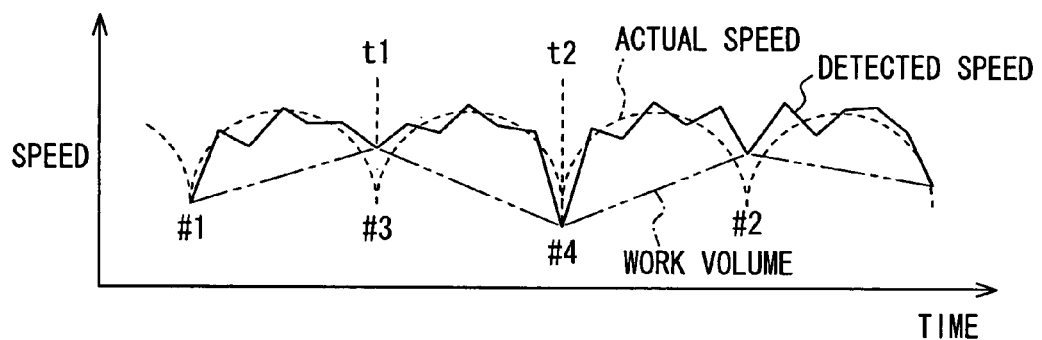

Here, it can be thought that when the combustion period of each cylinder is finished, the work volume of each cylinder is computed from the revolution speed at that time. For example, as shown in FIG. 6B, the work volume of the first cylinder is computed at timing t1 when the combustion period of the first cylinder is finished and then the work volume of the third cylinder is computed at timing t2 when the combustion period of the third cylinder is finished. However, in this case, the revolution speed computed by the detection signal (NE pulse) of the crank angle sensor 42 includes noises and factors of detection errors, and as shown in FIG. 6B, the detection value (shown by solid lines) of the revolution speed is varied with respect to an actual revolution speed (shown by broken lines). For this reason, there is presented a problem that the work volume cannot be computed correctly at the timings t1, t2.

Figure 7:
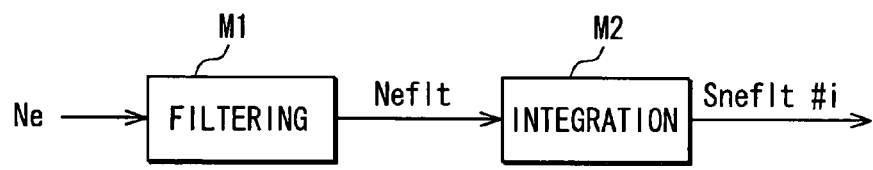
FIG. 7 is a block diagram to show control blocks for computing a cylinder work volume.

Thus, in this embodiment, as shown in FIG. 7, a filtering processing section M1 captures the revolution speed Ne as an input signal by at intervals of a specified angle and extracts only a revolution varying component at each timing to compute an instantaneous torque equivalent value Neflt. At this time, the revolution speed Ne is sampled at intervals of the output of the Ne pulse (30° CA in this embodiment). The filtering processing section M1 is constructed of, for example, BPF (band pass filter), and a high-frequency component and a low-frequency component included in the revolution speed signal are removed by the BPF. The instantaneous torque equivalent value Neflt(i) of the output of this filtering processing section M1 is expressed by, for example, the following equation (1).

$$Neflt(i) = k1 \times Ne(i) + k2 \times Ne(i-2) + k3 \times Neflt(i-1) + k4 \times Neflt(i-2) \quad (1)$$

In the equation (1), Ne(i) is this sampling value of revolution speed, Ne(i−2) is the last second sampling value of revolution speed, Neflt(i−1) is the last instantaneous torque equivalent value, Neflt(i−2) is the last second instantaneous torque equivalent value, and k1 to k4 are constants. Every time the revolution speed is inputted to the filtering processing section M1, the instantaneous torque equivalent value Neflt(i) is computed by the above equation (1).

The above equation (1) is an equation obtained by discretizing a transfer function G(s) expressed by the following equation (2) in which ζ is an attenuation coefficient and ω is a response frequency.

$$G(s) = \frac{2\zeta\omega s}{s^2 + 2\zeta\omega + \omega^2} \quad (2)$$

In this embodiment, in particular, a response frequency ω is assumed to be the combustion frequency of the diesel engine and, in the above equation (1), the constants k1 to k4 are set on the basis of the assumption that ω=combustion frequency. The combustion frequency is an angular frequency expressing a combustion frequency for each unit angle. In the case of four cylinders, the combustion period (combustion angular period) is 180° CA and the combustion frequency is computed by the inverse of the combustion period.

Moreover, an integration processing section M2 shown in FIG. 7 captures the instantaneous torque equivalent value Neflt and integrates the instantaneous torque equivalent value Neflt for each combustion period of each cylinder over a specified interval, thereby computing cylinder work volumes Sneflt #1 to Sneflt #4 of torque integration values of the respective cylinders. At this time, NE pulse numbers of 0 to 23 are assigned to Ne pulses outputted at intervals of 30° CA. Describing this in the order of combustion of the cylinders, NE pulse numbers of "0 to 5" are assigned to the combustion periods of the first cylinder, NE pulse numbers of "6 to 11" are assigned to the combustion periods of the third cylinder, NE pulse numbers of "12 to 17" are assigned to the combustion periods of the fourth cylinder, and NE pulse numbers of "18 to 23" are assigned to the combustion periods of the second cylinder. Cylinder work volumes Sneflt #1 to Sneflt #4 are computed for the respective cylinders #1 to #4 by the following equation (3).

$$Sneflt\#1 = Neflt(0) + Neflt(1) + Neflt(2) + Neflt(3) + Neflt(4) + Neflt(5)$$

$$Sneflt\#3 = Neflt(6) + Neflt(7) + Neflt(8) + Neflt(9) + Neflt(10) + Neflt(11)$$

$$Sneflt\#4 = Neflt(12) + Neflt(13) + Neflt(14) + Neflt(15) + Neflt(16) + Neflt(17)$$

$$Sneflt\#2 = Neflt(18) + Neflt(19) + Neflt(20) + Neflt(21) + Neflt(22) + Neflt(23) \quad (3)$$

Here, in the following description, a cylinder number is also denoted by #i, cylinder work volumes Sneflt #1 to Sneflt #4 are also denoted by cylinder work volume #i.

Figure 8:
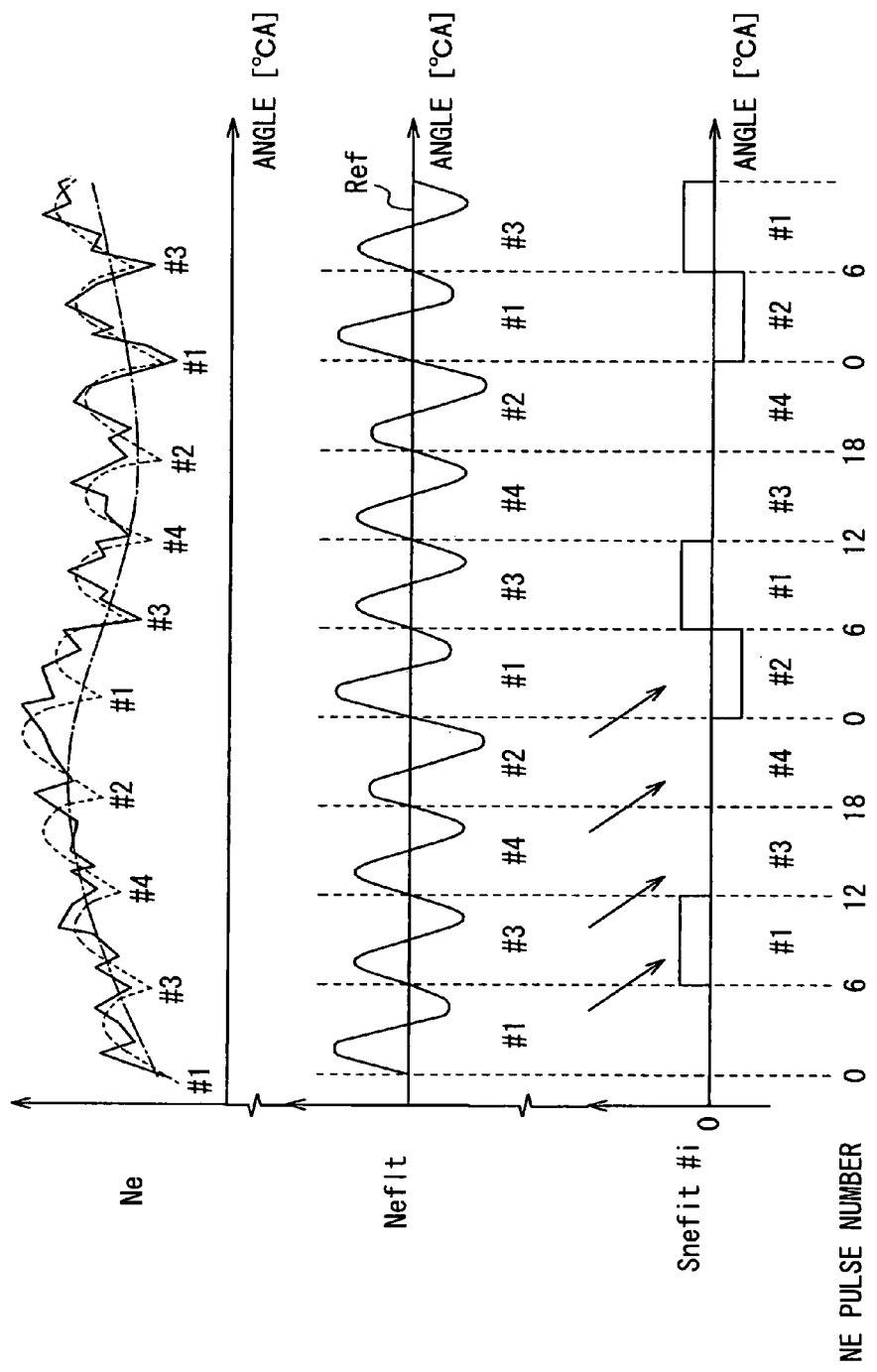
FIG. 8 is a time chart to show the progress of a revolution speed, an instantaneous torque equivalent value, and a cylinder work volume.

FIG. 8 is a time chart to show the progresses of the revolution speed Ne, the instantaneous torque equivalent value Neflt, and the cylinder work volume Sneflt #i. In FIG. 8, the instantaneous torque equivalent value Neflt oscillates up and down with respect to a reference level Ref, and the cylinder work volume Sneflt #i is computed by integrating the instantaneous torque equivalent value Neflt within the combustion period of each cylinder. Moreover, at this time, the integrated value of the instantaneous torque equivalent value Neflt on the positive side of the reference level Ref corresponds to a combustion torque, and the integrated value of the instantaneous torque equivalent value Neflt on the negative side of the reference level Ref corresponds to a load torque. Here, the reference level Ref is determined according to the average revolution speed of the respective cylinders.

In this case, the balance on the combustion torque and the load torque primarily becomes zero in the combustion period of each cylinder and the cylinder work volume Sneflt #i becomes 0 (the combustion torque−the load torque=0). However, when the injection characteristics and friction characteristics of the fuel injection valve 24 are different between the respective cylinders because of the individual difference and secular change of each cylinder, variations in the cylinder work volume Sneflt #i occur. As shown in the drawing, variations occur as follows: the cylinder work volume Sneflt #1>0 for the first cylinder, whereas the cylinder work volume Sneflt #2<0 for the second cylinder.

By computing the cylinder work volume Sneflt #i in the above manner, it is possible to grasp how much difference the injection characteristics of the fuel injection valve 24 cause with respect to an ideal value for each cylinder and how much variations the injection characteristics of the fuel injection valve 24 cause between the cylinders.

Figure 9:
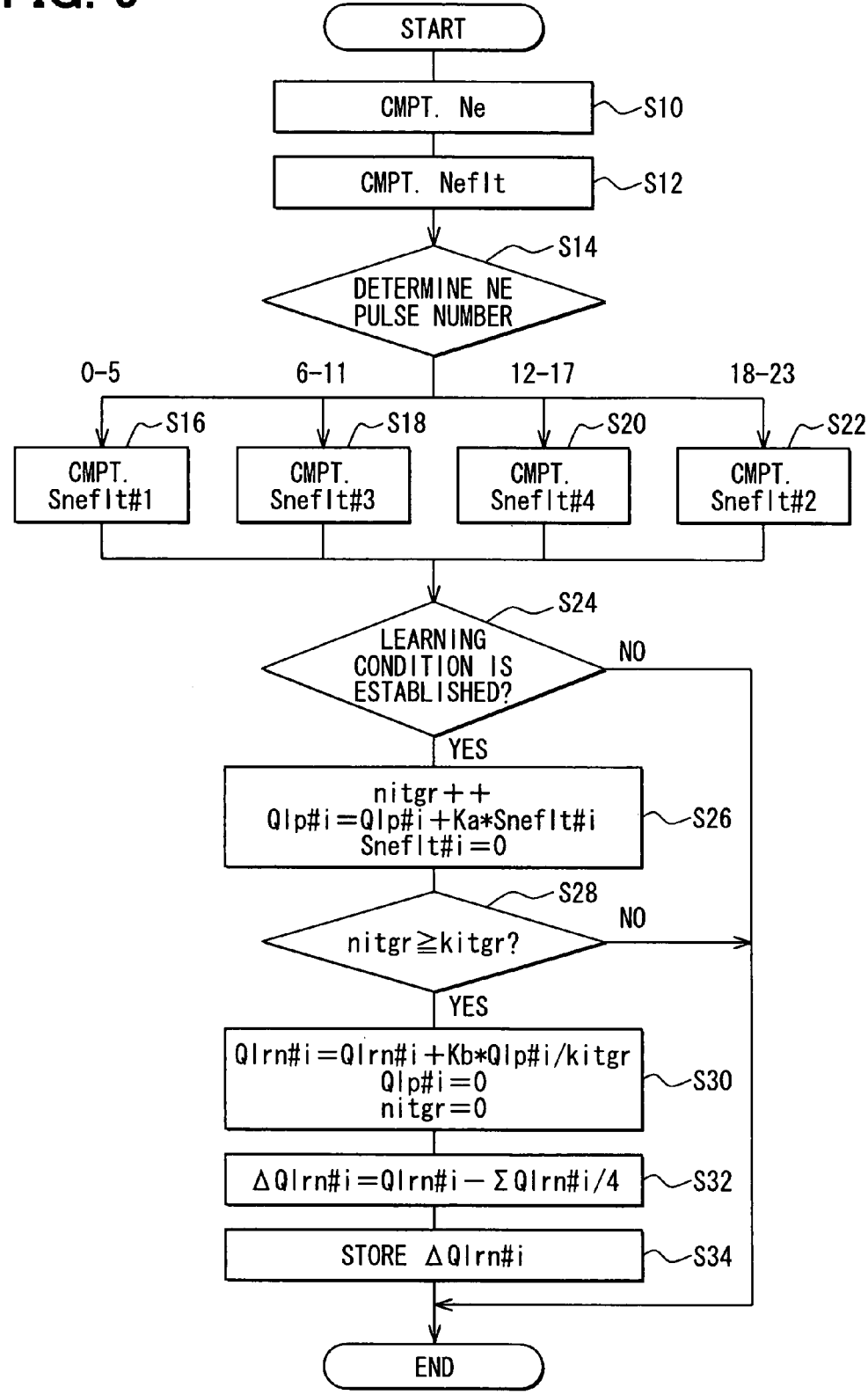
FIG. 9 is a flow chart to show a processing procedure relating to the learning of an injection quantity learning value according to the first embodiment.

Thus, in this embodiment, the amount of deviation between the cylinders of the injection characteristics of the fuel injection valve 24 is learned as the amount of deviation between the cylinders of the cylinder work volume Sneflt #i by the use of the cylinder work volume Sneflt #i. FIG. 9 shows the procedure of processing relating to the computation of the amount of deviation. This processing is processing performed by the torque computation section B14, the injection quantity learning section B20, and the injection quantity learning value storage section B22, which are shown in FIG. 5. This processing is performed by the ECU 30 at the time of startup of the NE pulse.

In FIG. 9, first, in step S10, the time interval of the NE pulse is computed from the time of this NE interrupt and the time of the last NE interrupt, and a present revolution speed Ne (instantaneous revolution speed) is computed by computing a reciprocal of the time interval. In the subsequent step S12, the instantaneous torque equivalent value Nedflt(i) is computed by the use of the above equation (1).

In the subsequent step S14, it is determined this NE pulse number. In steps S16 to S22, the cylinder work volumes Sneflt #i are computed for the first to fourth cylinders: that is, when the NE pulse number is any one of "0 to 5", the cylinder work volume Sneflt #i of the first cylinder is computed (step S16);

when the NE pulse number is any one of "6 to 11", the cylinder work volume Sneflt #i of the third cylinder is computed (step S18);

when the NE pulse number is any one of "12 to 17", the cylinder work volume Sneflt #i of the fourth cylinder is computed (step S20); and when the NE pulse number is any one of "18 to 23", the cylinder work volume Sneflt #i of the second cylinder is computed (step S22).

Thereafter, in step S24, it is determined whether or not learning conditions hold. These learning conditions include that: the computation of the cylinder work volume is completed for all cylinders; the power transmission unit (drive train) of the vehicle is in a previously determined state; and environmental conditions are in a previously specified state, and when all of these conditions are satisfied, it is determined that the learning conditions hold. For example, as for the power transmission unit, it suffices to determine that when the clutch of the power transmission system is not in a half clutch state, the condition of the power transmission unit is satisfied. Moreover, as for the environmental condition, it suffices to determine that when an engine cooling water is a specified idling completion temperature or more, the condition of the environmental condition is satisfied.

When the learning conditions do not hold, this processing is finished without performing any processing. Moreover, when the learning conditions hold, the routine proceeds to step S26. In step S26, a counter nitgr is incremented by one and an integrated quantity Qlp #i is computed for each cylinder by the use of the following equation (4). Here, the integrated quantity Qlp #i is an integrated value of an injection characteristic value computed by multiplying the cylinder work volume Sneflt #i by a conversion coefficient Ka. When the counter nitgr reaches a specified number of times, this integrated quantity Qlp #i is averaged by the specified number of times to compute the injection characteristic value.

$$Qlp\ \#i = Qlp\ \#i + Ka \times Sneflt\ \#i \quad (4)$$

Here, when the above processing is performed, the cylinder work volume Sneflt #i of each cylinder is cleared to zero.

Then, in step S28, it is determined whether or not the counter nitgr reaches a specified number of times kitgr. The specified number of times kitgr is set to a value capable of suppressing a computation error caused by noises or the like when the injection characteristic value is computed. The injection characteristic value is obtained by multiplying the cylinder work volume Sneflt #i by the conversion factor Ka. When nitgr≧kitgr, the routine proceeds to step S30. In step S30, the injection characteristic value Qlrn #i is computed for each cylinder. Then, the integrated quantity Qlp #i is cleared to zero and the counter nitgr is cleared to zero.

$$Qlrn\ \#1 = Qlrn\ \#i + Kb \times Qlp\ \#i/kitgr \quad (5)$$

In the equation (5), the integrated quantity Qlp #i integrated for the specified number of times kitgr is averaged and the injection characteristic value Qlrn #i is updated by the averaged learning value. At this time, each error of the cylinder work volume Sneflt #i can be absorbed by averaging the integrated quantity Qlp #i. Here, in the above equation (5), the coefficient Kb is set so as to satisfy a range, for example, "0<Kb≦1".

Next, in step S32, an injection quantity learning value ΔQlrn #i is computed by the use of the following equation (6).

$$\Delta Qlrn\#i = Qlrn\#i - \frac{1}{4}\sum Qlrn\#i \quad (6)$$

The quantity of deviation of the injection characteristic value Qlrn #i for each cylinder with respect to the average value (¼×Σ Qlrn #i) of the injection characteristic values of all cylinders can be computed by the use of the equation (6).

In the next step S34, the injection quantity learning value ΔQlrn #i is written to the specified area of the continuous storage holding memory 52. The data storage area of the foregoing data in the continuous storage holding memory 52 is allotted to each of a plurality of areas divided by using the fuel injection quantity and the fuel pressure in the common rail 22 as parameters. Since the injection quantity learning value ΔQlrn #i varies depending on the injection fuel quantity and the fuel pressure, the injection quantity learning value ΔQlrn #i is stored in each of the areas divided by the fuel injection quantity and the fuel pressure. For this reason, by learning the injection quantity learning value ΔQlrn #i for each area, the fuel injection valve 24 can be operated by the suitable injection quantity learning value ΔQlrn #i corresponding to the fuel injection quantity and the fuel pressure.

When the injection quantity learning value ΔQlrn #i is computed and stored, the fuel injection valve 24 is operated by the use of this injection quantity learning value ΔQlrn #i in the fuel injection control of the next and subsequent times.

<Ignition Timing Control>

Figure 10:
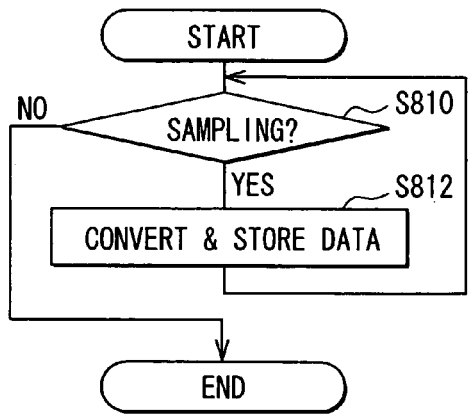
FIG. 10 is a flow chart to show the procedure of processing for acquiring the output of a cylinder pressure sensor according to the first embodiment.

FIG. 10 shows the procedure of processing for acquiring the output of the cylinder pressure sensor 21. This processing is performed by the A/D conversion section B4 shown in FIG. 5. This processing is repeatedly performed at specified time intervals or at specified crank angle intervals.

In this series of processings, first, in step S810, it is determined whether or not this timing is within a sampling interval in which pressure in the combustion chamber 20 of the fourth cylinder #4 is sampled. Here, the sampling interval is set in such a way as to include an interval in which the combustion of the fuel occurs in the combustion chamber 20 of the fourth cylinder #4. While it is determined that this timing is within the sampling interval, in step S812, analog data outputted by the cylinder pressure sensor 21 is converted to digital data and stored at specified intervals. Here, the sampling interval is finished, then this series of processings are finished.

Figure 11:
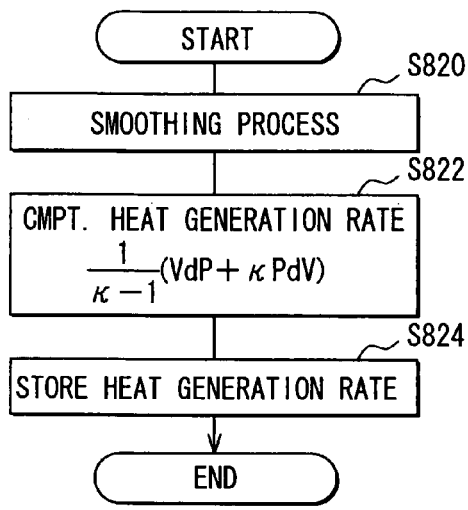
FIG. 11 is a flow chart to show the procedure of processing for computing a heat generation rate according to the first embodiment.

FIG. 11 shows the procedure of processing relating to the computation of a heat generation rate. This processing is a processing performed by the heat generation rate computation section B8 shown in FIG. 5.

In this series of processings, first in step S820, the data of cylinder pressure obtained by the processing shown in FIG. 10 is subjected to smoothing processing to relax a rapid change in the cylinder pressure. This processing is performed so as to suppress the effect of accidental noises and the like and can be realized by, for example, weighted average processing or moving average processing of the last sampling value and this sampling value. In the next step S822, a heat generation rate is computed on the basis of the cylinder pressure data after the smoothing processing. Here, the heat generation rate is computed by the following equation by the use of the cylinder pressure P, the volume V of the combustion chamber 20, and the ratio of specific heat κ.

Heat generation rate=$(VdP+\kappa PdV)/(\kappa-1)$

In the next step S824, the heat generation rate is stored for each crank angle. Here, when the above processing in step S824 is finished, this series of processings are once finished.

Figure 12:
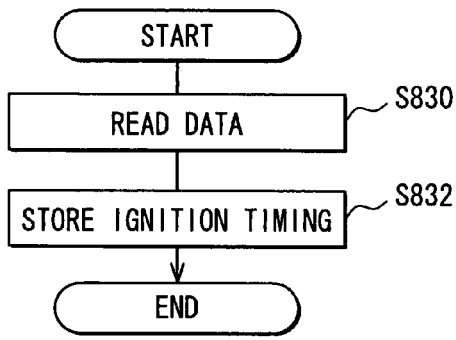
FIG. 12 is a flow chart to show the procedure of processing for computing the ignition timing of main combustion according to the first embodiment.

FIG. 12 shows the procedure of processing for computing an ignition timing of main combustion of an ignition timing of the fuel by the main injection. This processing is processing performed by the fourth cylinder injection timing computation section B10 shown in FIG. 5. This processing is repeatedly performed, for example, at specified intervals.

Figure 13:
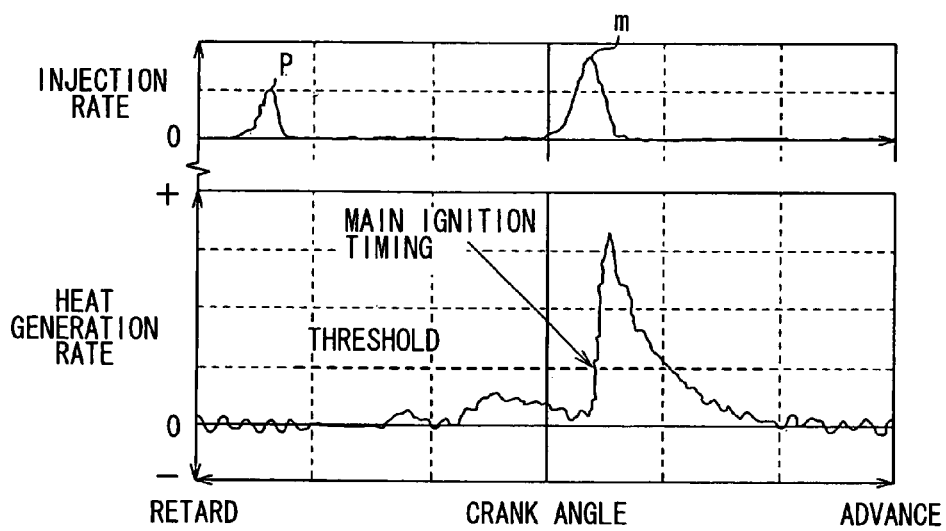
FIG. 13 is a time chart to show a mode for computing the ignition timing.

In this series of processings, first in step S830, the data of the heat generation rate computed by the processing shown in FIG. 11 is read. In the next step S832, a timing when the heat generation rate crosses a threshold from a state in which the heat generation rate is smaller than the threshold is computed and stored as an ignition timing. That is, as shown in FIG. 13, the timing when the heat generation rate crosses the threshold is assumed to be the ignition timing of the fuel by the main injection. Here, in FIG. 13, a case is shown by way of example in which two steps of injections of the first pilot injection and the main injection are performed within one combustion cycle. Here, when the processing in step S832 is finished, this series of processings are finished.

Figure 14:
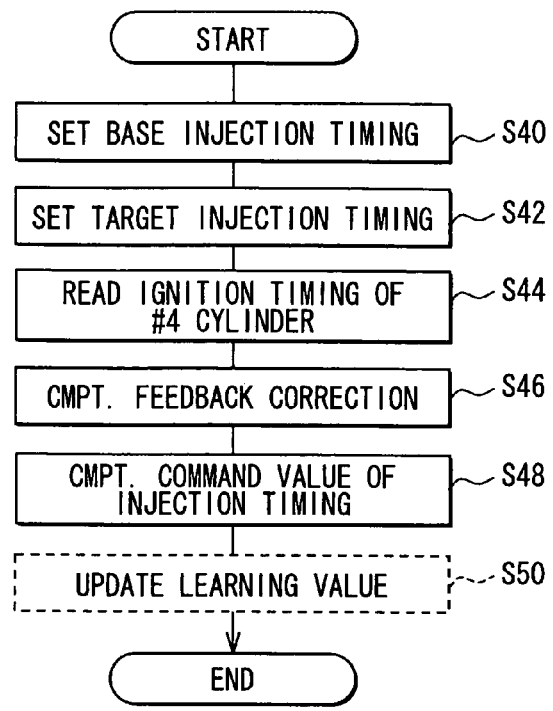
FIG. 14 is a flow chart to show the procedure of feedback control of the ignition timing of a cylinder mounted with a cylinder pressure sensor according to the first embodiment.

FIG. 14 shows the procedure of processing for an ignition timing feedback control of the fourth cylinder #4 mounted in the cylinder pressure sensor 21. This processing is processing performed by the fourth cylinder injection timing computation section B10 and the fourth cylinder injection timing learning value storage section B12 shown in FIG. 5. Here, this processing is repeatedly performed, for example, at specified intervals.

In these series of processings, first in step S40, the base value (base injection timing) is set on the basis of the revolution speed, the command injection quantity, and what combustion control is performed (combustion pattern). Here, the base injection timing is the sum of the feed-forward value based on the foregoing parameters and the injection timing learning value of a correction value of the feed-forward value learned by the feedback control shown in this FIG. 14. In the next step S42, a target ignition timing is set on the basis of the revolution speed, the command injection quantity, and the combustion pattern. The relationship between the foregoing parameters and the target ignition timing is found so as to be able to control the exhaust characteristics well. In the next step S44, the ignition timing of the fourth cylinder #4 mounted with the cylinder pressure sensor 21, computed by processing shown in FIG. 12, is read.

In the next step S46, a feedback correction quantity for bringing the ignition timing to the target ignition timing is computed. Here in step S46, it suffices to perform, for example, proportional control based on the difference between the ignition timing and the target ignition timing. Then, in step S48, the command value of the injection timing is computed as the sum of the base injection timing and the feedback correction quantity. The ignition timing can be feedback controlled by operating the injection timing by this command value.

In this regard, when learning conditions are satisfied, for example, the feedback correction quantity of the feedback control becomes stable and the distance traveled from the last learning reaches a specified distance, in step S50, the injection timing learning value is updated by the feedback correction quantity. Then, when the processing in step S48 or step S50 is finished, these series of processings are once finished.

Figure 15:
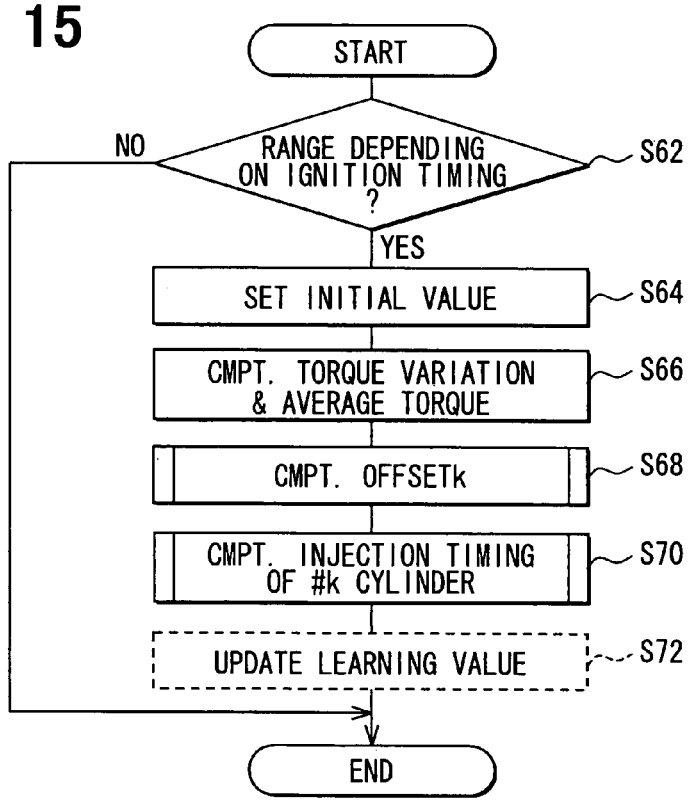
FIG. 15 is a flow chart to show the procedure of feedback control of the ignition timing of a cylinder not mounted with a cylinder pressure sensor according to the first embodiment.

FIG. 15 shows the procedure of processing for ignition timing feedback control of cylinders #k (k=1 to 3) not mounted with the cylinder pressure sensor 21. This processing is performed by the torque computation section B14, the injection timing deviation computation section B16, and the deviation learning value storage section B18, which are shown in FIG. 5. This processing is repeatedly performed, for example, at specified intervals.

In these series of processings, first in step S62, it is determined whether or not this is an operating range in which a change in the output torque relative to a small change in the ignition timing is more remarkable than a change in the output torque relative to a small change in the injection quantity. That is, it is determined whether or not this is the pre-mixed/low-temperature combustion range or the rich combustion range. When it is determined that this is the foregoing operating range, the routine proceeds to step S64. In step S64, an initial value of the injection timing deviation of each cylinder #k is set with respect to the injection timing of the fourth cylinder #4 that is the cylinder mounted with the cylinder pressure sensor 21. Here, the initial value is a value obtained by adding the learning value of the injection timing deviation to a feed-forward value determined by the revolution speed, the command injection quantity, and the combustion pattern.

Figure 16:
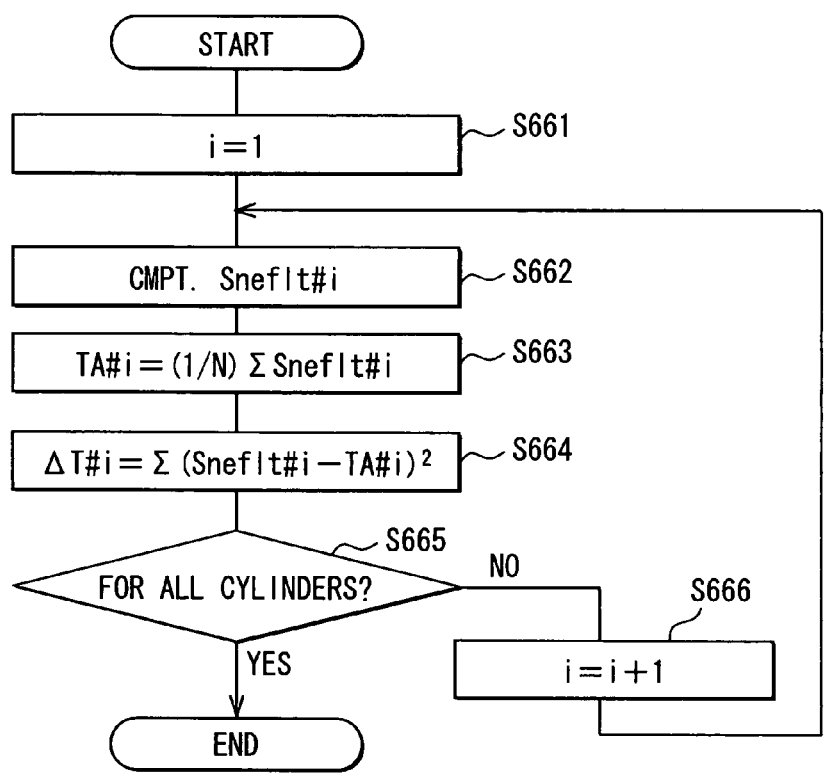
FIG. 16 is a flow chart to show the procedure of processing for computing a torque variation quantity and a torque average value according to the first embodiment.

In the next step S66, the torque variation quantity of each cylinder #i and the torque average value in N combustion cycles are computed. Here, the torque average value is an average value in the N combustion cycles produced by the combustion of the fuel in each cylinder #i. Moreover, the torque variation quantity is a parameter obtained by quantifying variations in the N combustion cycles of the torque produced by the combustion of the fuel in each cylinder #i. This processing is shown in FIG. 16.

That is, first in step S661, a parameter i for determining a cylinder number is set to "1". In the next step S662, the cylinder work volume Sneflt #i of the i-th cylinder is computed for N (N: plural number) combustion cycles. Then, in step S663, the average value of the cylinder work volume Sneflt #i for the N combustion cycles is computed as the torque average value TA #i of the i-th cylinder. In the next step S664, the sum of the squares of the difference between the cylinder work volume Sneflt #i and the torque average value TA#i for the N combustion cycles is computed as torque variation quantity ΔT #i. In the next step S665, it is determined whether or not the torque average value TA #i and the torque variation quantity ΔT #i are computed for all cylinders. When the computation is not finished for all cylinders, the routine proceeds to step S666 where the foregoing parameter i is incremented by one and then the processings in steps S662 to S666 are repeatedly performed. On the other hand, when it is determined in step S665 that the computation is finished for all cylinders, the processing in step S66 shown in FIG. 15 is finished.

Figure 17:
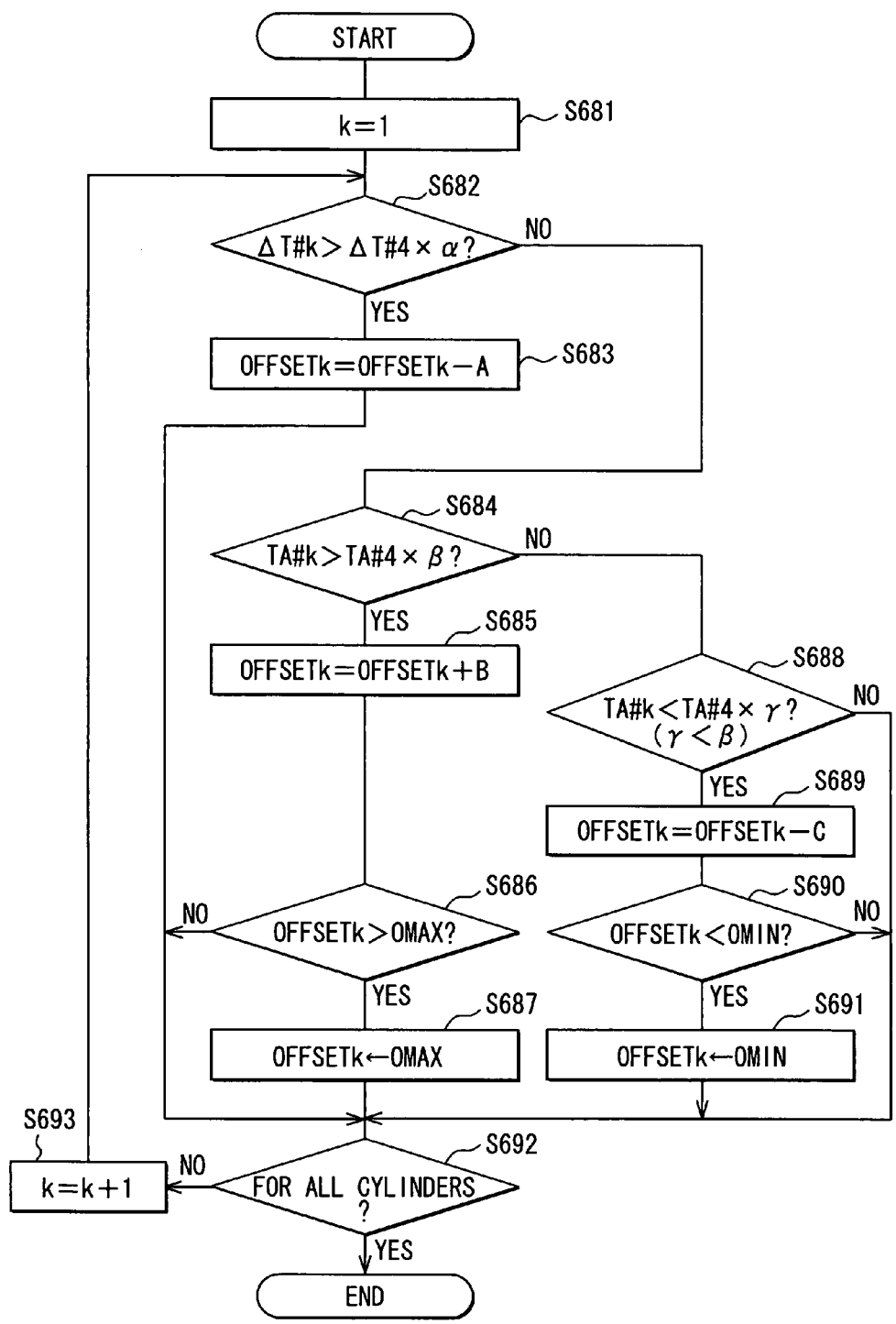
FIG. 17 is a flow chart to show the procedure of processing for computing the correction value of the ignition timing of the cylinder not mounted with a cylinder pressure sensor according to the first embodiment.

In step S68 following the processing in step S66, the correction values OFFSETk of the ignition timing deviations of the first cylinder #1 to the third cylinder #3 are computed on the basis of the toque variation quantity and the torque average value. These correction values OFFSETk are used for correcting the initial values computed in the step S64 by the deviations of the injection timings of the first cylinder #1 to the third cylinder #3 with respect to the injection timing of the fourth cylinder #4. This processing is shown in FIG. 17.

In these series of processings, first in step S681, a parameter k for determining a cylinder number is set to "1". In the next step S682, it is determined whether or not the torque variation quantity ΔTA #k of the k-th cylinder #k is larger than the torque variation quantity ΔTA #4 of the fourth cylinder by a specified value or more, in other words, whether or not the torque variation quantity ΔTA #k is larger than the ΔTA #4×α. This processing is performed so as to determine whether or not the combustion of the k-th cylinder becomes unstable and is in a state in which a misfire might be caused. Here, the feedback control based on the detected ignition timing is performed for the fourth cylinder #4, so it is assumed that the fourth cylinder #4 is avoided from unstable combustion. For this reason, when the torque variation quantity ΔTA #k of the k-th cylinder #k is larger than the torque variation quantity ΔTA #4 of the fourth cylinder by the specified value or more, it can be thought that the combustion in the k-th cylinder #k is brought to an unstable state. The foregoing constant α is a parameter used for determining whether or not the combustion in the k-th cylinder #k is brought to an unstable state on the basis of the degree by which the torque variation quantity ΔTA #k of the k-th cylinder #k is larger than the torque variation quantity ΔTA #4 of the fourth cylinder #4. When it is determined in step S682 that the torque variation quantity ΔTA #k of the k-th cylinder #k is larger than the torque variation quantity ΔTA #4 of the fourth cylinder #4 by the predetermined value or more, a specified quantity A is subtracted from the correction quantity OFFSETk in step S683 to correct the injection timing to an advance side.

On the other hand, when determination in step S682 is negative, the routine proceeds to step S684. In the processings in step S684 to S691, the torque produced by the combustion in the k-th cylinder #k is feedback controlled to the torque produced by the combustion in the fourth cylinder #4 to make the ignition timing of the k-th cylinder #k correspond to the ignition timing of the fourth cylinder #4. That is, in step S684, it is determined whether or not the torque average value TA #k of the k-th cylinder #k is larger than the torque average value TA #4 of the fourth cylinder #4 by a specified value or more, in other words, whether or not the torque average value TA #k is larger than the specified value TA #4×β. Then, when determination in step S684 is affirmative, in step S685, a specified quantity B is added to the correction value OFFSETk to perform the processing of correcting the injection timing of the k-th cylinder #k to a delay side. In the next step S686, it is determined whether or not the correction value OFFSETk is larger than an upper limit value OMAX. This upper limit value OMAX determines an allowable deviation quantity of the injection timing of the k-th cylinder #k with respect to the injection timing of the fourth cylinder #4. When determination in step S686 is affirmative, in step S687, the correction value OFFSETk is set to the upper limit value OMAX.

On the other hand, when determination in step S684 is negative, the routine proceeds to step S688. In step S688, it is determined whether or not the torque average value TA #k of the k-th cylinder #k is smaller than the torque average value TA #4 of the fourth cylinder by a specified value or less, in other words, whether or not the torque average value TA #k is smaller than the specified value TA #4×γ. Then, when determination in step S688 is affirmative, in step S689, a specified quantity C is subtracted from the correction value OFFSETk to perform the processing of correcting the injection timing of the k-th cylinder #k to an advance side. In the next step S690, it is determined whether or not the correction value OFFSETk is smaller than a lower limit value OMIN. This lower limit value OMIN determines an allowable deviation quantity of the injection timing of the k-th cylinder #k with respect to the injection timing of the fourth cylinder #4. When determination in step S690 is affirmative, in step S691, the correction value OFFSETk is set to the lower limit value OMIN. In this regard, the absolute value of the upper limit value OMAX is set smaller than the absolute value of the lower limit value OMIN. This is because of the following reason.

When the diesel engine 10 is used, the clearance between the piston and the cylinder inner wall is increased. For this reason, in the diesel engine 10, compression pressure in the combustion chamber 20 is decreased by its secular change and hence combustion is brought to the unstable state, in other words, a misfire tends to easily occur. In this point, by increasing the allowable deviation quantity to the advance side, the misfire can be suitably suppressed irrespective of the secular change. Moreover, by decreasing the allowable deviation quantity to the delay side, the occurrence of the misfire caused by an excessive delay can be suitably suppressed.

When the processings in steps S683, S687, and S691 are finished or when determinations in steps S686, S688, and S690 are negative, the routine proceeds to step S692. In step S692, it is determines whether or not the computation of correction value OFFSETk is finished for all cylinders of the first cylinder #1 to the third cylinder #3. Then, when the computation is not finished, in step S693, the foregoing parameter k is incremented by one and the processings in steps S682 to S692 are repeatedly performed. On the other hand, it is determined in step S692 that the computation of correction value OFFSETk is finished for all cylinders, the processing in step S68 shown in FIG. 15 is finished.

Then, in step S70 shown in FIG. 15, the injection timing of the k-th cylinder #k is computed as a value obtained by adding the initial value and the correction value OFFSETk to the injection timing of the fourth cylinder #4. Here, when the learning conditions hold, for example, the correction value OFFSETk becomes stable and the distance traveled from the last learning reaches the specified distance, in step S72, the injection timing learning value is updated by the feedback correction quantity. Then, when processing in step S70 or step S72 is finished or when determination in step S62 is negative, these series of processings are once finished.

Figure 18:
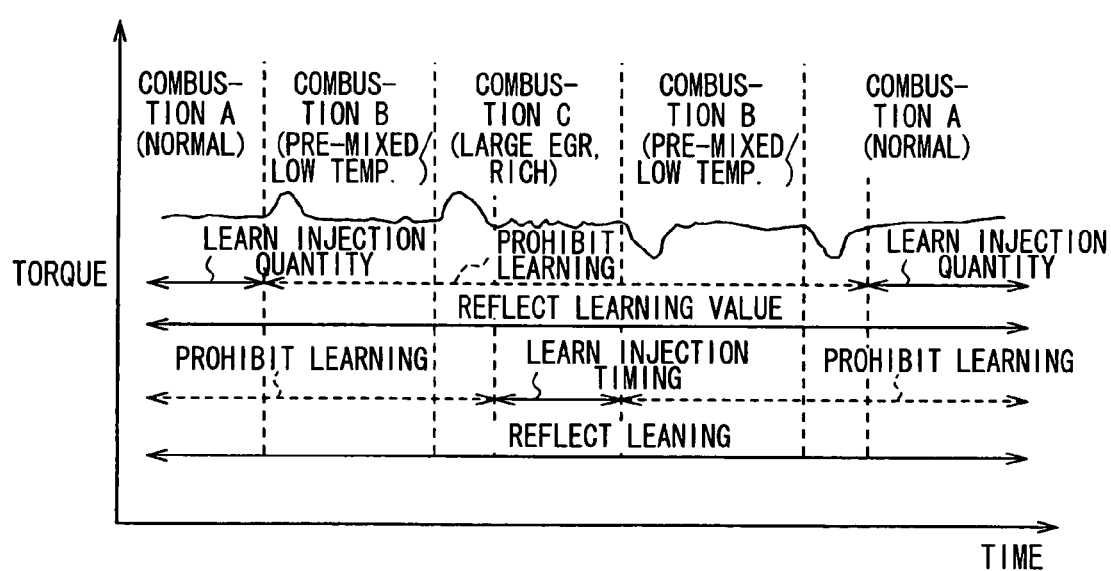
FIG. 18 is a time chart to show the learning of a learning value and the mode of reflecting the learning value according to the first embodiment.

FIG. 18 shows the learning of the fuel injection quantity and the fuel injection timing and the state of reflecting of the learning values in this embodiment. In this embodiment, the learning of the injection quantity is performed after a specified time passes from when the state of combustion of the fuel moves to the normal combustion, so an erroneous learning caused by learning in a transient state can be suitably avoided. Moreover, in this embodiment, the learning of the injection timing is performed after a specified time passes from when the state of combustion of the fuel moves to the rich combustion, so an erroneous learning caused by learning in a transient state can be suitably avoided.

In this regard, the respective leaning values are reflected in all states of combustion of the fuel, but it is preferable that a learning value suitably corrected in consideration of the difference between the operating ranges is used in place of using the learning value learned in the specified state of combustion of the fuel. That is, for example, when the injection quantity learning value learned in the normal combustion is used at the time of the rich combustion, it is preferable that the injection quantity learning value is converted for use, in consideration of the difference between the operating state in which the injection quantity learning value is learned and the operating state in which the rich combustion is carried out (difference in the fuel pressure or the like), to an appropriate value in the operating state in which the rich combustion is carried out.

According to the present invention described above in detail, the following effects can be produced.

(1) The injection timing of the fourth cylinder #4 is feedback controlled to the target ignition timing and, at the same time, the injection timing of the other cylinder #k is operated in such a way as to make the torque produced by the combustion in the other cylinder #k correspond to the torque produced by the combustion in the fourth cylinder #4, thereby controlling the ignition timing of the other cylinder #k in such a way as to correspond to the ignition timing of the fourth cylinder #4. With this, it is possible to suitably operate the injection timings of all cylinders on the basis of the detection result of the cylinder pressure sensor 21 for detecting the pressure in the combustion chamber of a part of the cylinders of the diesel engine 10.

(2) The injection quantity learning value for correcting the fuel quantity to be actually injected into each of the respective cylinders in such a way as to make the torques produced by the combustion in the respective cylinders close to each other is learned under an operating condition (at the time of normal combustion) in which a small change in the injection quantity has a more predominant effect on a change in the output torque of the diesel engine 10 than a small change in the injection timing. With this, it is possible to appropriately learn the injection quantity learning value. Moreover, by using this learning value at the time of controlling the ignition timing, it is possible to determine the factors of variations in the torque produced by the combustion between the cylinders for the control of the ignition timing. Thus, it is possible to appropriately perform the control of the ignition timing based on the output torque.

(3) In the cylinder of the first cylinder #1 to the third cylinder #3 in which the torque variation quantity $\Delta TA$ #k produced by the combustion is larger than the torque variation quantity $\Delta T$ #4 produced by the combustion in the fourth cylinder #4 by the specified quantity or more, the injection timing is operated to the advance side by the specified quantity. By operating the injection timing in this manner to the advance side in which a misfire is less easily caused, it is possible to appropriately avoid the possibility of causing the misfire.

(4) The injection quantity learning values for making the ignition timings of the first cylinder #1 to the third cylinder #3 correspond to the ignition timing of the fourth cylinder #4 are learned. With this, it is possible to use the injection quantity learning values at the time of controlling the ignition timings of these cylinders, and by extension, to quickly control the ignition timings.

(5) The learning of the injection timings of the first cylinder #1 to the third cylinder #3 is performed after a specified time passes from when an operating range moves into the operating range (rich combustion range) in which a small change in the injection timing has a more predominant effect on a change in the output torque of the diesel engine 10 than a small change in the injection quantity. With this, it is possible to appropriately learn the injection timing learning values. In addition, the learning is performed after the specified time passes from when the operating range moves into the foregoing operating range, so it is possible to appropriately avoid an erroneous learning caused by learning in the transient state.

(6) The injection timing learning value to make the ignition timing of the fourth cylinder #4 correspond to the target ignition timing is learned. With this, it is possible to use the injection timing learning value at the time of controlling the ignition timing of the fourth cylinder #4, and by extension, to quickly control the ignition timing.

(7) The learning of the injection timing of the fourth cylinder #4 is performed after a specified time passes from when an operating range moves into the operating range (rich operating range) in which a small change in the injection timing has a more predominant effect on a change in the output torque of the diesel engine 10 than a small change in the injection quantity. With this, it is possible to appropriately learn the injection timing learning values. In addition, the learning is performed after the specified time passes from the time when the operating range moves into the foregoing operating range, so it is possible to appropriately avoid an erroneous learning caused by learning in the transient state.

(8) To make the ignition timing of each cylinder correspond to the target ignition timing, the quantity of feed-forward operation of the fuel injection valve 24, related to the injection timing, is set for each operating range of the diesel engine 10. With this, it is possible to make the injection timing to quickly follow the target injection timing.

(9) In the allowable deviation quantities of the injection timings of the first cylinder #1 to the third cylinder #3 from the injection timing of the fourth cylinder #4, the allowable deviation quantities on the advance side are set larger than the allowable deviation quantities on the delay side. With this, it is possible to appropriately suppress a misfire irrespective of the secular change.

(10) The fourth cylinder #4 in which the quantity of inflow of the exhaust gas to be recirculated (EGR gas) is the largest is mounted with the cylinder pressure sensor 21. The cylinder in which the quantity of inflow of the exhaust gas to be recirculated is the largest is a cylinder having the highest possibility that combustion will become unstable, in other words, a cylinder having the highest possibility that a misfire will occur. In this point, by mounting such cylinder with the cylinder pressure sensor 21, it is possible to directly monitor the state of combustion and hence to appropriately prevent combustion from becoming unstable.

(11) The output torque of the diesel engine 10 is computed on the basis of an increase in the rotation of the output shaft of the diesel engine 10 produced by fuel injection in each cylinder. With this, it is possible to perform various kinds of processings based on the output torque without providing a new hard ware such as a torque sensor.

(12) The ignition timing control of the first cylinder #1 to the third cylinder #3 on the basis of the torque of the fourth cylinder #4 is performed in an operating range in which a change in the output torque of the diesel engine 10 to a small change in the injection timing becomes larger than a specified value. With this, it is possible to appropriately perform the control of the ignition timings of these cylinders.

Second Embodiment

Hereinafter, a second embodiment will be described with a focus on the difference between the first embodiment and the second embodiment with reference to the drawings.

Figure 19:
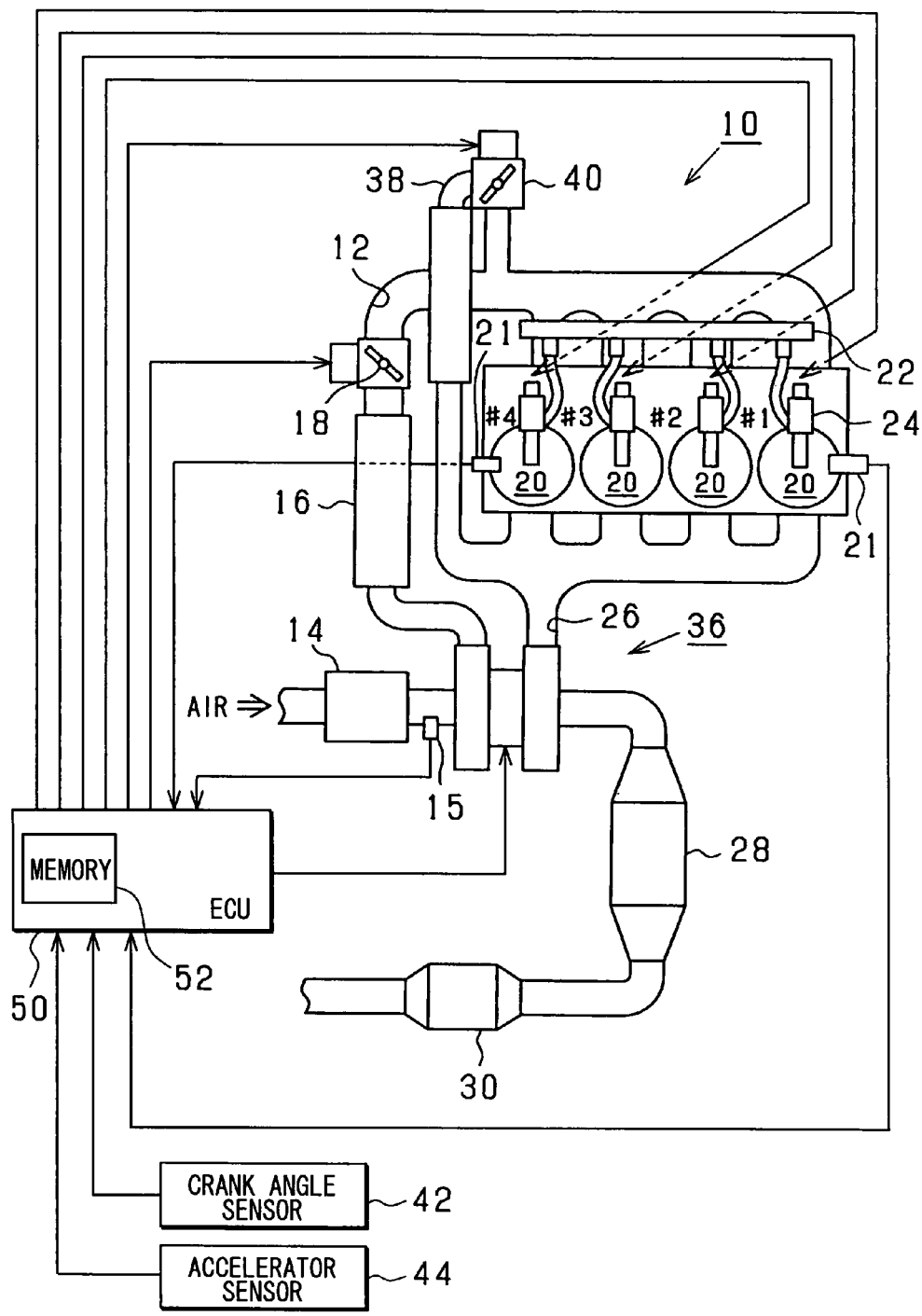
FIG. 19 is a diagram to show the entire construction of an engine system according to a second embodiment.

In FIG. 19 is shown the entire construction of an engine system according to this embodiment. As shown in the drawing, in this embodiment, in addition to the fourth cylinder #4, the first cylinder #1 having the least quantity of EGR is also mounted with the cylinder pressure sensor 21. The output torque produced by the combustion of the fuel in the third cylinder #3 is made to correspond to the output torque produced by the combustion of the fuel in the fourth cylinder #4 to control the ignition timing of the third cylinder #3. In other words, the ignition timing of the third cylinder #3 is controlled by making the output torque produced by the combustion of the fuel in the third cylinder #3 correspond to the output torque produced by the combustion of the fuel in the fourth cylinder #4 which is similar to the third cylinder #3 in the state of inflow of the EGR gas. Moreover, the output torque produced by the combustion of the fuel in the second cylinder #2 is made to correspond to the output torque produced by the combustion of the fuel in the first cylinder #1 to control the ignition timing of the second cylinder #2. In other words, the ignition timing of the third second #2 is controlled by making the output torque produced by the combustion of the fuel in the second cylinder #2 correspond to the output torque produced by the combustion of the fuel in the first cylinder #1 which is similar to the second cylinder #2 in the state of inflow of the EGR gas. In this manner, it is possible to control the ignition timings of the second cylinder #2 and the third cylinder #3, which are not mounted with the cylinder pressure sensor 21, on the basis of the comparison of the output torque with the first cylinder #1 and the fourth cylinder #4 which are similar in the state of inflow of the EGR gas and hence can be thought to be similar in the state of ignition to the second cylinder #2 and the third cylinder #3.

According to this embodiment, in addition of the effects shown in (1) to (9), (11), and (12) produced by the first embodiment, the following effects can be further produced.

(13) The plurality of cylinders, each of which is mounted with the cylinder sensors 21, are selected in such a way as to be the most different from each other in the state of inflow of the exhaust gas to be recirculated. With this, it is possible to control the injection timing to the target injection timing with higher accuracy.

Other Embodiments

In this regard, the foregoing respective embodiments may be modified for implementation.

In the respective embodiments, the range in which the learning of the injection timing is performed is limited to the rich combustion range. However, when the learning of the injection quantity is finished, the learning of the injection timing can be performed with high accuracy also in the premixed/low-temperature range.

The method for computing the output torque produced by the combustion of each cylinder on the basis of an increase quantity in the rotation of the output shaft of the diesel engine 10 developed by the fuel injection in each cylinder is not limited to those disclosed by way of example in the embodiments. In short, an increase quantity in the revolution speed of the output shaft with respect to the revolution speed immediately before the fuel injection of each cylinder is a parameter relating to the output torque, the increase quantity being developed by the fuel injection, so it suffices to quantify the output torque by an appropriate method based on this parameter.

The torque variation quantity is not limited to what is quantified by the method described by way of example in the embodiments. For example, the torque variation quantity may be quantified in the following manner: any one of torque or its equivalent values in an arbitrary combustion cycle of the N combustion cycles is set as a reference value; and the torque variation quantity is quantified on the basis of the deviation of any one of torque or its equivalent values in the other combustion cycle from the reference value.

Moreover, in place of computing the output torque produced by the combustion in each cylinder on the basis of an increase quantity in the rotation of the output shaft of the diesel engine 10, the increase quantity being developed by the fuel injection in each cylinder, a torque sensor may be provided and the output torque may be detected by the torque sensor.

The method for selecting a cylinder mounted with the cylinder pressure sensor 21 is not limited to the methods described by way of example in the embodiments. For example, in a V-type cylinder, one cylinder pressure sensor 21 may be provided for each group of cylinders.

What is claimed is:

1. A fuel injection controller for a multiple-cylinder internal combustion engine of a compression ignition type, wherein a fuel injection valve of the internal combustion engine is operated on the basis of detection result of a detection means for detecting pressure in a combustion chamber of a part of the cylinders to control an ignition timing of each cylinder toward a target ignition timing, the fuel injection controller comprising:
    a part-of-cylinders control means for operating an injection timing of the part of the cylinders on the basis of the detection result by the detection means in the part of the cylinders to feedback control an ignition timing computed on the basis of the detection result toward the target ignition timing; and
    an other-cylinders control means for operating injection timings of other cylinders in such a way as to bring torques produced by combustion in the other cylinders in agreement with a torque produced by combustion in the part of the cylinders at a time of the feedback control performed by the part-of-cylinders control means, thereby controlling ignition timings of the other cylinders in such a way as to be in agreement with the ignition timing of the part of the cylinders.

2. A fuel injection controller for an internal combustion engine as claimed in claim 1, further comprising:
    an injection quantity learning means for learning an injection quantity learning value for correcting a fuel quantity to be actually injected into each cylinder in such a way as to bring the torques produced by combustion in the respective cylinders close to each other under an operating condition in which a small change in an injection quantity has a more predominant effect on a change in an output torque of the internal combustion engine than a small change in the injection timing,
    wherein the injection quantity learning value is reflected to an operation quantity relating to an injection quantity of the fuel injection valve at a time of control performed by the part-of-cylinders control means and at a time of control performed by the other-cylinders control means.

3. A fuel-injection controller for an internal combustion engine as claimed in claim 1, wherein
    the other-cylinders control means operates the injection timing of a cylinder of the other cylinders to an advance side by a specified quantity, the cylinder being a cylinder in which a torque variation quantity produced by combustion is larger than a torque variation quantity produced by combustion in the part of the cylinders by a specified quantity or more.

4. A fuel injection controller for an internal combustion engine as claimed in claim 1, further comprising:
    an other-cylinders learning means for learning an injection timing learning value for bringing the ignition timings of the other cylinders in agreement with the ignition timing of part of the cylinders on the basis of the operation of the injection timings of the other cylinders by the other-cylinders control means.

5. A fuel injection controller for an internal combustion engine as claimed in claim 4, wherein
the other-cylinders learning means performs the learning after a specified time passes from when an operation of the part of the cylinders moves into an operating range in which a small change in the injection timing has a more predominant effect on a change in an output torque of the internal combustion engine than a small change in an injection quantity.

6. A fuel injection controller for an internal combustion engine as claimed in claim 1, further comprising:
a part-of-cylinders learning means for learning an injection timing learning value for bringing the ignition timing of the part of the cylinders in agreement with the target ignition timing on the basis of the operation of the injection timing of the part of the cylinders by the part-of-cylinders control means.

7. A fuel injection controller for an internal combustion engine as claimed in claim 6, wherein
the part-of-cylinders learning means performs the learning after a specified time passes from when an operation of the part of the cylinders moves into an operating range in which a small change in the injection timing has a more predominant effect on a change in an output torque of the internal combustion engine than a small change in an injection quantity.

8. A fuel injection controller for an internal combustion engine as claimed in claim 1, further comprising:
a setting means for setting a feedforward operation quantity of the fuel injection valve relating to an injection timing for each operating range of the internal combustion engine so as to make the ignition timings of the respective cylinders to the target ignition timing.

9. A fuel injection controller for an internal combustion engine as claimed in claim 1, wherein
an allowable deviation quantity of the injection timing, which is operated by each of the other cylinders, from the injection timing of the part of the cylinders is set larger in an advance direction than in a retard direction.

10. A fuel injection controller for an internal combustion engine as claimed in claim 1, wherein
the internal combustion engine includes an exhaust recirculation passage for recirculating exhaust gas in an exhaust passage to an intake passage, and
the part of the cylinders is a single cylinder having a largest inflow quantity of the exhaust gas to be recirculated.

11. A fuel injection controller for an internal combustion engine as claimed in claim 1, wherein
the internal combustion engine includes an exhaust recirculation passage for recirculating exhaust gas in an exhaust passage to an intake passage, and
wherein the part of the cylinders is a plurality of cylinders, which are selected in such a way that a degree of difference between the plurality of cylinders in an inflow mode of the exhaust gas to be recirculated is the largest.

12. A fuel injection controller for an internal combustion engine as claimed in claim 1, further comprising:
a torque computation means for computing an output torque of the internal combustion engine on the basis of an increase in rotation of an output shaft of the internal combustion engine produced by fuel injection in each cylinder.

13. A fuel injection controller for an internal combustion engine as claimed in claim 1, wherein
the control by the other-cylinders control means is performed in an operating range in which a change in an output torque of the internal combustion engine with respect to a small change in the injection timing becomes a specified value or more.

* * * * *